May 12, 1931.  H. H. SMITH  1,805,020
APPARATUS FOR PRODUCING LIGHT AGGREGATES
Filed May 14, 1930
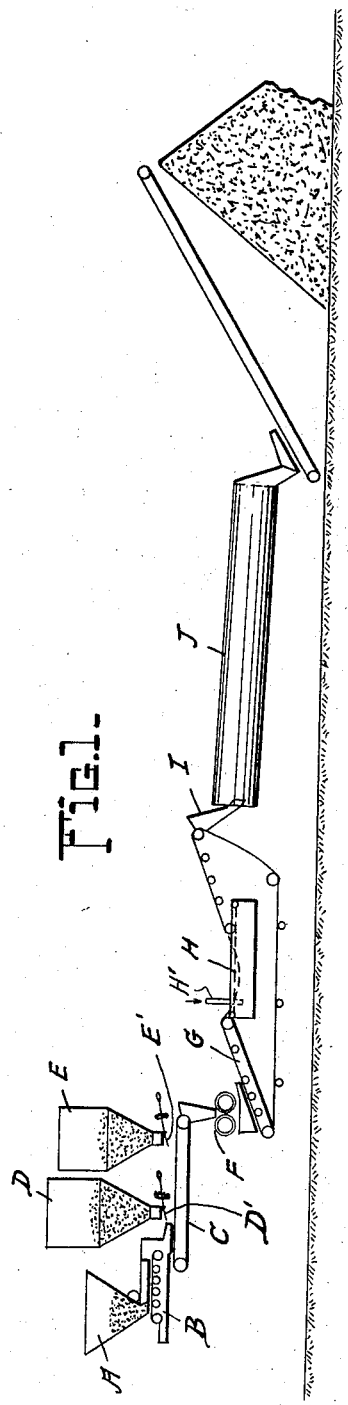
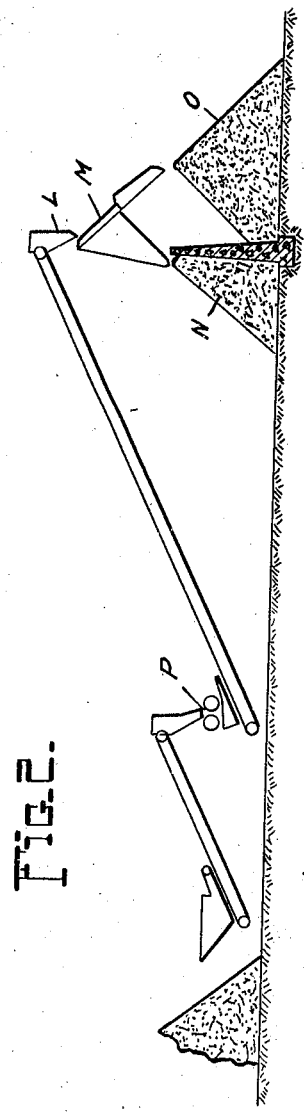
Inventor
Harry H. Smith.
By Robert Cobb
Attorney Patented May 12, 1931

1,805,020

UNITED STATES PATENT OFFICE

HARRY H. SMITH, OF MASSILLON, OHIO, ASSIGNOR TO INDUSTRIAL SILICA CORPORATION, OF YOUNGSTOWN, OHIO, A CORPORATION

APPARATUS FOR PRODUCING LIGHT AGGREGATES

Application filed May 14, 1930. Serial No. 452,441.

This invention embodies certain novel apparatus for the production of light aggregates suitable to be used in concrete mixtures employed today for the ordinary purposes of building and other construction, in which Portland cement, so called, is utilized as the cementitious binder. A light aggregate for the above purpose is much desired for use in making concrete at this time and by my present apparatus I am enabled to produce an aggregate of this class by processing the very cheap silica sand and gravel deposits which are available in large proportions throughout the country. My apparatus by processing such materials converts them from very cheap and to a certain extent commercially unsalable products, into a much more valuable and salable product susceptible of employment for the purposes stated.

The apparatus of this invention involves primarily, suitable crushing means for initially treating the silica gravel for mechanical reduction, mixing the silica materials with iron and a flux, special means for coating thoroughly each particle of gravel in such a way as to apply thereto a film of gas forming substance, and heat treating means for roasting the coated mixture so that the latter is heated to effect fusion of the iron with the silica in the presence of the flux employed, a coating or film of gas forming substance being burned in this operation so that the iron is caused to form a honeycombed network of crystals or particles surrounding the silica and producing a bond between the silica grains or particles, which bond is of high strength.

In the accompanying drawings I show a single exemplification of my apparatus which may take, however, a number of different forms insofar as the various features or parts thereof are concerned by which I obtain the desired results hereinafter more fully set forth.

The invention herein embodies a certain novel apparatus for producing a light aggregate from silica sand or gravel deposits. The aggregrate which is produced by my apparatus constitutes a new product which also forms an invention embodied herein.

As is well known today, the production of a light aggregate material suitable for use in concrete mixtures employing a cementitious binder, is a desired manufacture. Especially is this true when the material from which the aggregate may be made is one obtainable in large volume and very cheaply, and such that when it is processed to produce a light aggregate, becomes much enhanced in value and obtains a greater market than when procured in its original condition.

With the foregoing in mind, a special object of these inventions is to process silica sand and gravel as it may be obtained from ample deposits available, and as it may be combined with cheap waste or by-products, whereby to create a light aggregate suitable for advantageous use in concrete mixtures such as above mentioned.

In the carrying out of my invention, I primarily admix silica gravel after it has been partially reduced as described hereinafter, with iron, and heat treat the two when combined, in the presence of a flux, so as to obtain a fusion of such substances in order to produce the light aggregate which is my end product. In the carrying out of my inventions I avail of new apparatus, a new process, and secure a new product, and this application is directed primarily to the apparatus features. In the processing of my silica materials, the heat treatment is preferably carried on by the use of a suitable roasting kiln or any heat treating apparatus in which the desired temperatures may be obtained, and I avail of special treatment of the silica and iron when mixed in that I coat these materials in respect to each particle thereof with a gasifying medium which acts in the heat treatment step of my process to form a relatively large amount of combustible gas caused to burn around each particle of the material in order to cause the iron to be fused to the silica with a production of a network of the first mentioned substance about the silica grains or particles.

More specifically speaking, my process involves the subjecting of the mixture of silica materials and iron to the coating action of oil and steam after the said materials have been reduced mechanically to a certain extent as hereinafter set forth, the said coating action of materials preliminarily heating them and providing a coating of highly inflammable substance which acts in the heat treating operation later carried on to form the highly inflammable gas that materially assists in the formation of the network of iron around each particle of silica, this action taking place during the fusing operation in the presence of a suitable flux.

I have illustrated in the accompanying drawings an apparatus which is suitable for the carrying out of my process and the production of my end product, but I do not wish to be confined necessarily to the employment of a specific apparatus of this kind since it is possible within the purview of the invention to modify the construction and arrangement of the parts of the apparatus and nevertheless obtain by equivalent devices a carrying out of my process and the obtaining of the particular end product desired.

In the annexed drawings—

Figure 1 is a somewhat diagrammatic view of apparatus suitable for the purpose of the invention, and Figure 2 is a view of the process of grading the light aggregates produced by my apparatus to divide them into at least two sizes, one size approximately that of ordinary aggregate sand used in concrete mixtures, and the other size that of gravel or larger stone aggregate such as used in such mixtures.

There is now described a preferred type of apparatus by which my product may be secured.

For treatment in my apparatus as hereinafter set forth, I utilize preferably a mix which consists of 40% silica gravel, 40% crushed silica gravel, 13% flue dust comprising iron principally, 7% crushed limestone.

My apparatus may readily be changed in details, but my drawings show at A a hopper in which the silica gravel is received, it being assumed that this gravel has been separated by any suitable method for use for the purposes of this invention. The gravel will preferably be washed for obtaining the best possible results in practicing the process performed by the apparatus. For the hopper A I employ a regulating discharge to supply the clean gravel to the conveyor B which carries the gravel forward to a second conveyor C. Gravel received on the conveyor C iron is fed to the conveyor from a hopper D and this iron may comprise filings, though I preferably employ flue dust. This flue dust is especially desirable to use, because while it only contains perhaps 50% iron, it at times contains also a proportion of magnesia, some lime, and some silica. With the iron added to the silica gravel the conveyor C carries the two onward beneath the flux hopper E. The hopper E is equipped with an adjustable discharge E' as is also the hopper D, and adjustable door D', for the control of the feed from the two hoppers on to the conveyor C. For my flux fed from the hopper E I preferably use crushed limestone, or I may employ sodium carbonate. Any suitable flux may be employed to lower the melting point of the product. Just beyond the hopper E the said materials pass to the hopper of a roll crusher F, by which the gravel is mechanically reduced to the extent of approximately 50% thereof. After issuing from the roll crusher the materials pass on to a steel apron conveyor G, a portion of which enters a tank H and dips into the liquid contents of the tank so as to completely submerge the materials in such contents.

In the tank H I provide a bath of oil such as fuel oil preferably. Directed downwardly toward and into the oil bath in the tank H are one or more steam injectors H' for supplying steam under high pressure to heat the oil for the purpose of thoroughly coating every particle of the mixture entering the bath on the apron G with oil. At the same time the mixture is heated to a relatively high temperature so that as it issues from the bath and enters the charging chute I of the rotary kiln J the material is well prepared for the roasting operation which next takes place. In the rotary kiln J the now oil coated particles of the materials treated in the manner stated are raised to a temperature of approximately 2500° F. to 2800° F. and incident to the roasting action there is generated a considerable amount of gas produced by the burning of the oil surrounding the individual particles of the materials. It is to be borne in mind that the application of the steam to the oil in the tank H results, practically speaking, in saponifying the oil of the bath and therefore the materials are coated with both the oil and the steam previous to their passing to the kiln J. I do not wish to be limited to the saponification of the oil because my apparatus and process would be effective though possibly not as highly efficient, without the use of the steam. However, when the materials are coated with steam and oil they are treated for obtaining the best possible results from the roasting operation in the kiln in that the action of burning in the kiln involves a more rapid penetration of the heat of burning throughout the mass of each particle of the materials, this greater penetration being facilitated by the combustion of the inflammable oil and steam mixture which coats the said materials so thoroughly.

In the roasting kiln J the novel action which is performed involves necessarily the fusion of the iron with the silica particles in the presence of a relatively large amount of gas generated in the kiln incident to the ordinary burning operation therein, and additionally incident to the burning of the combined steam and oil surrounding or with which the particles are coated. In the action of the fusion of the materials the gas surrounding the silica in the burning operation has the effect of producing a fusion in which the iron is caused to honeycomb about each silica particle. This is of primary advantage of course when it is borne in mind that the objective in view is to produce a light aggregate.

The roasting operation in the kiln J is carried on at the temperature range of approximately 2500 to 2800° F. It should be borne in mind that an initial heating of the materials is obtained by the application of the saponified oil and steam thereto and this heat may desirably be availed of by being maintained as much as is commercially practicable by quickly conveying the materials from the bath to the kiln. In the carrying out of my process I preferably use an inclined kiln J having preferably at its discharge end a heating zone the temperature of which is substantially 2500° F. At the point where the materials enter the kiln the temperature therein may be much less than the above temperature notation. However, it is required according to my invention that the materials be maintained in the temperature zone of 2500° of the kiln for at least approximately four or five minutes, after which they may pass out of the kiln, having been subjected to the proper heat treatment.

The foregoing discussion of the temperature range used in the kiln for the final heat treatment operation has to do with a mixture such as referred to when I use limestone as a flux. On the other hand when I employ sodium carbonate as a flux, I would not require the high range of temperature of 2500° F., but may utilize a temperature range of approximately 1800° or 1900° F. It is possible of course that variation in the proportion of minerals and the flux, and the proportion of minerals in the flue dust, will change the temperature requirements of the heat treatment action of my process, so I do not wish to be absolutely limited in respect to the phase of my invention involving the particular temperatures that I have set forth herein, though these have proved most suitable according to my experiments up to the time of this application.

It is to be understood that within the purview of my invention I contemplate the use of other heat treatment apparatus than the kiln J because I may employ an electric furnace process of heat treatment wherein the materials are carried through the furnace upon a suitable conveyor, the movement of which is timed properly to provide the required heat treatment such as I have generally provided herein.

After issuing from the kiln or other heat treatment apparatus used by me, the materials will be received upon a suitable conveyor and carried off for deposit in a stock pile. A light aggregate which is produced by my process and apparatus hereinbefore described which is a mixture of silica particles surrounded by a network of iron, physically possesses a honeycomb appearance. The iron produces a bond between the silica particles of greater tenacity than the silica itself. Physically, the silica remains in my aggregate substantially unchanged from its original condition other than as it is bonded in the bulk of aggregates produced. The foregoing might be limited however to the extent of indicating that the silica may undergo and probably does undergo natural volume changes owing to the temperatures to which it is subjected.

After the processing of my materials in the apparatus described, they may be taken from the stock pile at any time, loaded upon a suitable conveyor, and fed to a suitable mechanical crusher. In this mechanical crusher they are reduced and conveyed off to an elevated chute designated L from which they drop upon a suitable screen, and I may use one provided with a $\frac{1}{16}$ opening designated at M. The finer particles will be separated by the screen and will largely comprise a fine aggregate providing virtually a light weight sand aggregate which will become deposited in the pile N, while the larger particles in passing through the screen N will be deposited in an aggregate pile O of the larger size. The larger sized aggregate is found very suitable for use in concrete mixtures as the larger aggregate customarily employed while the finer light sand aggregate from the pile N may be readily used as a substitute for the ordinary sand used in concrete aggregates today. Under these conditions I am able to utilize the entire aggregates produced by the process in the working of the said apparatus. Now it is to be understood that the size of the aggregate may be regulated at will to suit the particular mixture which is to be produced, assuming such mixture to be a common concrete mixture. By adjusting the rolls of the crusher P I am enabled to produce a proper size of larger aggregate to meet a particular specification, with which aggregate the finer aggregate, sand, screened out therefrom, will be used in the final concrete mixture.

It is noted that it is possible to produce my light aggregate involving the fusion of iron with silica without utilizing the application of oil and steam preliminary to the introduction of the mixture to the heat treating apparatus. I therefore claim a relatively low heat treated end product involving the production of a light aggregate consisting of fused iron and silica substantially as set forth. The foregoing contemplates of course that there may be used in the carrying out of my process some substitute for the oil and steam coating step by which I may obtain the fusion of the iron with the silica in the presence of the surrounding gas which insures the formation of the network of iron by which the iron and silica are bonded together.

It is to be understood that I may employ in lieu of the two hoppers D and E, a single hopper which may contain a flue dust largely consisting of iron and also contain suitable flux materials which are susceptible of acting in the manner of those that are referred to as being contained in the hopper E in the form of my apparatus illustrated. Some flue dust which is available today has waste or tailings I have found to contain the large proportion of iron desired, together with flux materials suitable for the purposes of these inventions.

Having thus described my invention, what I claim as new and desire to secure by Letters Patent of the United States, is—

1. Apparatus for producing an aggregate material comprising means for feeding raw material to a conveyor, supplementary feeding means adapted to feed additional materials to the raw material to produce a mix, mixing means for homogeneously mixing and crushing the said materials, an oil bath adapted to receive the crushed mixture, means for passing the said mixture to the said oil bath, a firing kiln, and means to cause the said mixture to pass from the bath to said kiln.

2. Apparatus for producing a cellular ceramic product which comprises, in combination, means for feeding raw material to a conveyor, separate means for feeding additional reactant materials to the said raw material while the latter is on the conveyor, mixing means for producing a homogeneous mixture of the said raw and reactant materials, conveying mechanism for passing the resulting mixture into a coating means therefor, a coating means adapted to receive the said mixture and to coat the said mixture while passing through the coating means, conveyor means for bringing the thus coated material from the coating means, a furnace adapted to receive the said coated material as it issues from the coating means, and means for delivering the burned material from the furnace.

3. Apparatus for producing a ceramic product, comprising the combination with means for bringing together raw siliceous material and additional reactant materials, of means for producing a homogeneous mixture of the said raw and reactant materials, of an oil bath adapted to receive the mixed materials, means for conveying said materials therethrough at a speed sufficient to coat the individual particles of the mixture while in the bath, means adapted to introduce a heating fluid into the oil in the bath, and a furnace adapted to receive coated material from the bath and to heat the said material to a temperature substantially above the carbonizing point of the oil.

4. Apparatus for producing a ceramic product which comprises, in combination, means for combining a siliceous material with reactants therefor, the said reactants comprising fluxing materials and iron bearing substances, and crushing and mixing means for receiving the said siliceous and reactant materials, of an endless conveyor adapted to receive crushed and mixed materials from the said crushing and mixing means, an oil bath through which the said conveyor passes thereby carrying the mixed materials to the oil in the bath, and coating them with oil, a furnace receiving the thus oil treated materials from the conveyor, the furnace being adapted to heat the said materials above the carbonizing temperature of the oil and the reducing temperature of the iron in the iron bearing materials, and means for crushing and classifying the ignited product from the furnace.

5. Apparatus as set forth in claim 4, in which the said oil bath is combined with means adapted to introduce steam into the oil as the materials pass therethrough.

6. Apparatus for producing an aggregate material comprising, in combination, aggregate mixing, oil bathing, and firing means, the said firing means being arranged to receive oil bathed materials adapted to rapidly increase the temperature of the incoming materials to the desired maximum and to pass the said heated materials therethrough in bonded condition, and means for selectively separating the product issuing from the firing means.

In testimony whereof I affix my signature.

HARRY H. SMITH.